United States Patent
Lee et al.

(10) Patent No.: US 11,022,857 B2
(45) Date of Patent: Jun. 1, 2021

(54) METHOD OF OPTIMIZING PHASE OF OPTICAL PHASED ARRAY

(71) Applicant: SAMSUNG ELECTRONICS CO., LTD., Suwon-si (KR)

(72) Inventors: Jisan Lee, Suwon-si (KR); Inoh Hwang, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 185 days.

(21) Appl. No.: 16/291,781

(22) Filed: Mar. 4, 2019

(65) Prior Publication Data

US 2020/0110325 A1    Apr. 9, 2020

(30) Foreign Application Priority Data

Oct. 4, 2018 (KR) .......................... 10-2018-0118141

(51) Int. Cl.
*G02F 1/29* (2006.01)
*G01S 7/481* (2006.01)

(52) U.S. Cl.
CPC ............ *G02F 1/292* (2013.01); *G01S 7/4817* (2013.01); *G02F 2203/18* (2013.01); *G02F 2203/24* (2013.01)

(58) Field of Classification Search
CPC ........ G02F 1/29; G02F 1/292; G02F 2203/18; G02F 2203/24; B82Y 20/00; G02B 26/0816; G02B 27/48; G01S 7/4817; G01S 17/42; G01S 7/4814
USPC .......................................................... 359/298
See application file for complete search history.

(56) References Cited

U.S. PATENT DOCUMENTS

| | | | |
|---|---|---|---|
| 8,041,161 B1 | 10/2011 | Lane et al. | |
| 9,476,981 B2 | 10/2016 | Yaacobi et al. | |
| 9,964,833 B2 | 5/2018 | Eldada | |
| 9,989,831 B2 | 6/2018 | Pruessner et al. | |
| 2003/0071990 A1* | 4/2003 | Stich | G01B 11/27 356/153 |
| 2012/0013880 A1* | 1/2012 | Choi | G03F 7/70275 355/67 |
| 2015/0009069 A1* | 1/2015 | Yun | H04B 7/18515 342/368 |
| 2017/0366293 A1* | 12/2017 | Bergeron | H04K 1/006 |
| 2018/0107091 A1 | 4/2018 | Hosseini et al. | |
| 2018/0175501 A1 | 6/2018 | Byun et al. | |
| 2019/0294019 A1* | 9/2019 | Park | G02F 1/0121 |

OTHER PUBLICATIONS

Hutchinson, D., et al., "High-resolution aliasing-free optical beam steering", Aug. 2016, Optica, vol. 3, No. 8, p. 887-890.
(Continued)

*Primary Examiner* — Mohammed A Hasan
(74) *Attorney, Agent, or Firm* — Sughrue Mion, PLLC

(57) ABSTRACT

A method of phase optimization of an optical phased array (OPA) includes: performing a phase optimization in a beam forming process with respect to a single focal point, wherein the performing the phase optimization in the beam forming process may include: performing a first phase optimization in a first method to obtain a first beam phase profile; and performing a second phase optimization on the first beam phase profile in a second method that is different form the first method.

10 Claims, 10 Drawing Sheets

(56) References Cited

OTHER PUBLICATIONS

Mukai, R., et al., "Application of Genetic and Gradient Descent Algorithms to Wavefront Compensation for the Deep-Space Optical Communications Receiver", May 15, 2005, IPN Progress Report 42-161, p. 1-21.
Li, G., et al., "A Novel Electronic Beam Steering Technique in Time Modulated Antenna Arrays", 2009, Progress in Electromagnetics Research (PIER 97), p. 391-405.
Hulme, J., et al., "Fully integrated hybrid silicon two dimensional beam scanner", Mar. 9, 2015, Optics Express, vol. 23, No. 5, p. 5861-5874.
Xiao, F., et al., "Beam-steering efficiency optimization method based on a rapid-search algorithm for liquid crystal optical phased array", Jun. 1, 2017, Applied Optics, vol. 56, No. 16, p. 4585-4590.

\* cited by examiner

PHASE PROFILES SELECTED
AFTER FITNESS EVALUATION

PHASE PROFILES SELECTED
AFTER FITNESS EVALUATION

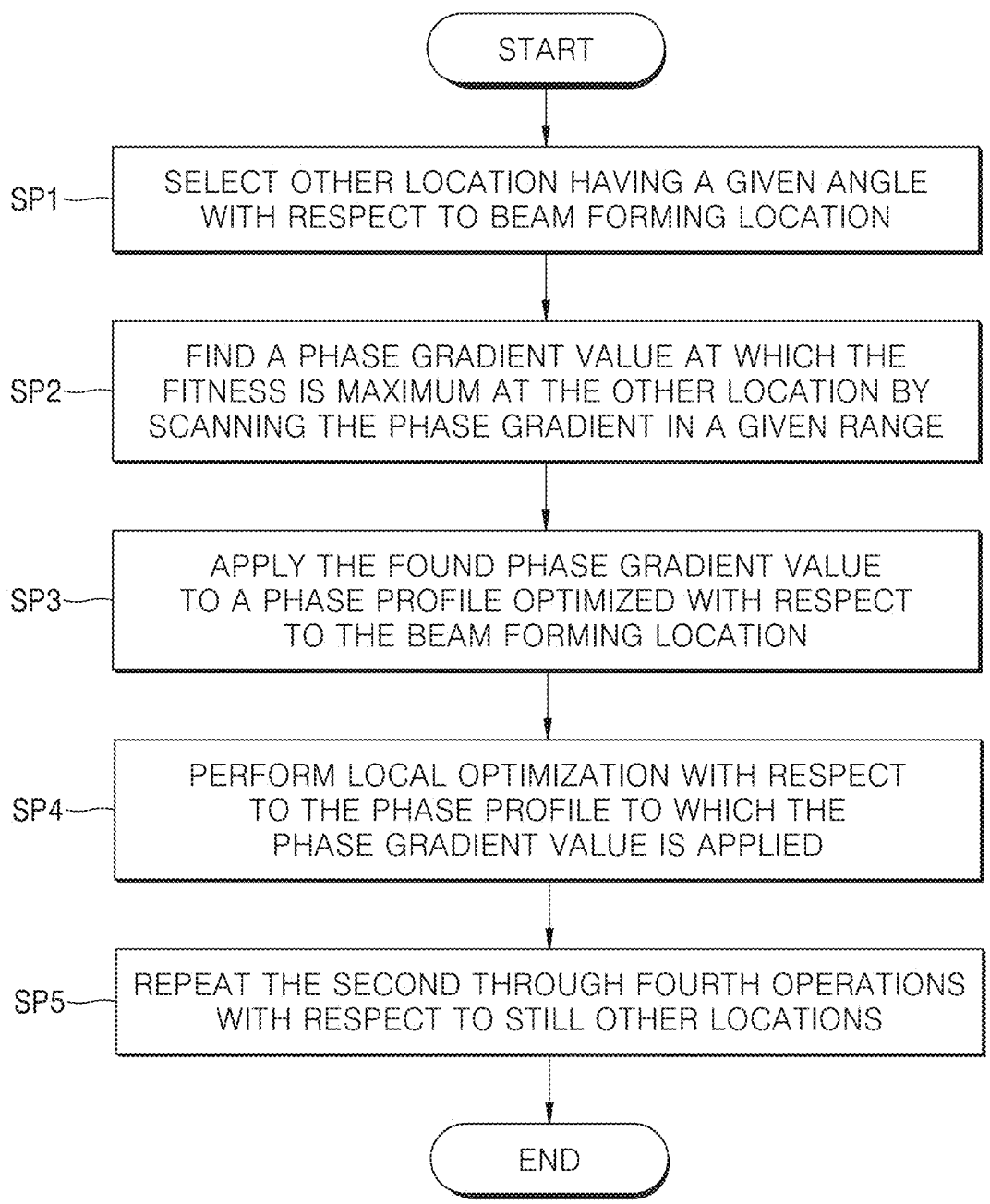

METHOD OF OPTIMIZING PHASE OF OPTICAL PHASED ARRAY

CROSS-REFERENCE TO RELATED APPLICATION

This application claims priority from Korean Patent Application No. 10-2018-0118141, filed on Oct. 4, 2018 in the Korean Intellectual Property Office, the disclosure of which is incorporated herein by reference in its entirety.

BACKGROUND

1. Field

Apparatuses and methods consistent with example embodiments relate to operations of an optical phased array (OPA), and more particularly, to methods of optimizing a phase of an OPA.

2. Description of the Related Art

An OPA, unlike a micro electro-mechanical system (MEMS) mirror, is a device that changes a travelling direction of light without a mechanical movement, and uses a technique that draws the spotlight in distance measuring sensors, such as a light detection and ranging (LiDAR) system, an optical tracking technique, or free space optical communication.

LiDAR systems that employ a beam scanning of the related art have a simple structure by using a device, such as a mechanical motor, a rotational motor, or an MEMS, but have problems of accuracy, reliability under mechanical shock and impact, and mass productivity. However, the OPA draws the attention because the OPA enables a non-mechanical beam scanning of the LiDAR system and the advantages that a precise and rapid control is possible and manufacturing cost may be greatly reduced in mass production.

In the OPA, for a high density integration, a photonic integrated circuit (IC) technique that forms a waveguide on a substrate by using lithography is mainly used, and related studies have been actively conducted.

When a waveguide is realized on a chip, ideally, the waveguide has to have a constant width and thickness. However, in an actual process, a random distribution of the shape of the waveguide occurs due to process errors, such as lithography, deposition, etching, etc. Accordingly, phases of optical signals have random differences from each other in each waveguide. In an actual use environment, there may be a phase change in the waveguide according to environment, such as external impact, vibration, operating temperature, etc.

SUMMARY

Example embodiments address at least the above problems and/or disadvantages and other disadvantages not described above. Also, the example embodiments are not required to overcome the disadvantages described above, and may not overcome any of the problems described above.

One or more example embodiments provide methods of optimizing a phase of an optical phased array (OPA) that may perform beam forming and beam steering with high efficiency and at a high speed.

According to an aspect of an example embodiment, there is provided a phase optimization method of an optical phased array (OPA) including: performing a phase optimization in a beam forming process with respect to a single focal point, wherein the performing the phase optimization in the beam forming process includes: performing a first phase optimization in a first method to obtain a first beam phase profile; and performing a second phase optimization on the first beam phase profile in a second method that is different form the first method.

The second method may include two different methods, and the performing the second phase optimization may include changing the first beam phase profile by sequentially applying the two different methods to the first beam phase profile.

The second method may be a local optimization method, and the performing the second phase optimization may include changing the first beam phase profile by applying the local optimization method to the first beam phase profile.

The first method may be a genetic algorithm method, and the performing the first phase optimization may include generating the first beam phase profile by applying the genetic algorithm method.

The two different methods may include a step scan method and a hill climb optimization method.

The local optimization method may be one of a step scan method and a hill climb optimization method.

The generating the first phase beam profile may include: generating a population comprising a plurality of beam phase profiles in a first operation; acquiring beam profile images with respect to the plurality of beam phase profiles in a second operation; evaluating a fitness with respect to the acquired beam profile images in a third operation; selecting at least one phase profile of the plurality of beam phase profiles on which the fitness evaluation is performed, in a fourth operation; generating a new population based on the selected beam phase profiles in a fifth operation; and repeating the second operation through the fifth operation with respect to the new population, and when a number of generations of the new population reaches a set number, selecting a beam phase profile corresponding to a maximum fitness value as the first beam phase profile.

The method may further include performing a multipoint phase optimization for a beam steering after performing the second phase optimization.

The fifth operation may include performing a crossover with respect to two beam phase profiles of the selected beam phase profiles.

The performing the multipoint phase optimization for the beam steering may include: setting a location different from a beamforming location of the single focal point; and applying a phase gradient to an updated beam phase profile obtained through the second phase optimization.

The method may further include controlling a phase of the updated beam phase profile by applying a local optimization method to the updated beam phase profile.

The applying the phase gradient to the updated beam phase profile may include: finding a phase gradient value at which a fitness is maximum in the location different from the beamforming location of the single focal point by performing a phase gradient scan in a given range with the phase gradient; and applying the phase gradient value to the updated phase profile obtained through the second phase optimization.

The controlling the phase the updated beam phase profile may include: controlling, by a step scan method, a phase of the updated beam; and controlling, by a hill climb optimization method, the phase of the updated beam phase profile that is controlled by the step scan method.

The fifth operation may include performing a mutation on at least one beam phase profile of the selected beam phase profiles.

According to an aspect of another example embodiment, there is provided a beam steering device including at least one processor configured to: perform a single phase optimization in a beam forming process with respect to a single focal point by performing a first phase optimization in a genetic algorithm method to obtain a first beam phase profile and performing a second phase optimization on the first beam phase profile in a local optimization method; and perform a multipoint phase optimization by setting a location different from a beamforming location of the single focal point as a multipoint focal point, and applying a phase gradient to an updated beam phase profile obtained through the second phase optimization.

BRIEF DESCRIPTION OF THE DRAWINGS

The above and/or other aspects will be more apparent by describing certain example embodiments, with reference to the accompanying drawings, in which:

FIG. 9 is a flowchart showing operations of a phase optimization method for OPA beam steering with respect to multipoint in an OPA phase optimization method according to an example embodiment.

DETAILED DESCRIPTION

Figure 1:
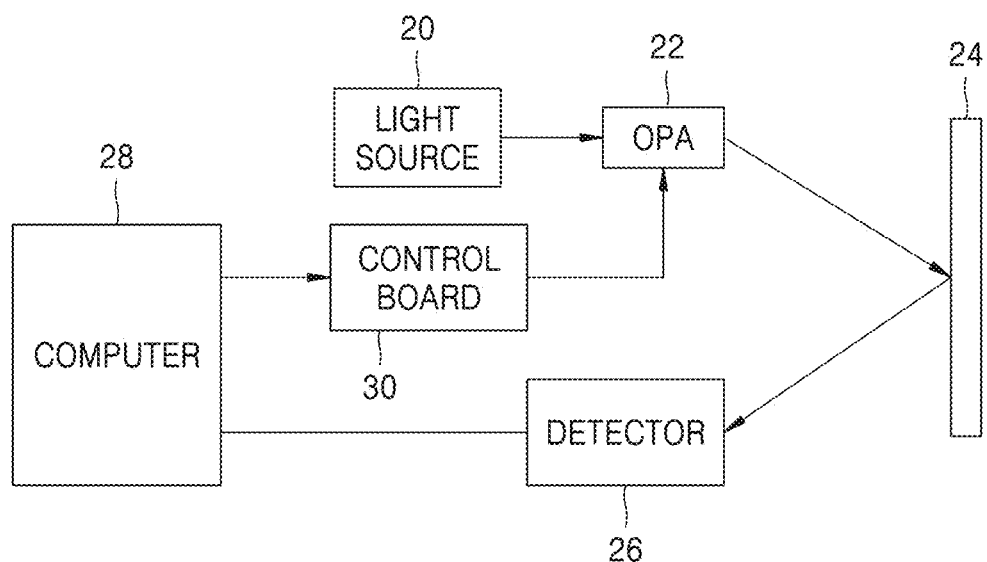
FIG. 1 is a diagram illustrating a beam steering device for realizing an optical phased array (OPA) phase optimization according to an OPA optimization method according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

In an optical phased array (OPA), in order to focus a shape of a beam on a point in real time, that is, to realize beam forming, a phase difference between each waveguide has to be corrected or controlled by using a phase shifter. Also, in order to realize steering by which a direction of a beam is changed, it is necessary to correct a phase difference in each angle. As the number of channels of the OPA increases, the number of variables required for a phase control increase. Also, since an optimized phase condition in each beam direction is different in beam steering, a process of correcting a phase difference, that is, a process of optimizing a phase of each of the channels, requires a significant time and complexity.

An embodiment disclosed herewith provides a method of OPA phase optimization (an OPA phase optimization method) for solving the problems occurring in an OPA operation and provides a method of performing a phase difference correction required in a beam forming and beam steering of an OPA with a high efficiency and a high speed.

In brief, the method of optimizing a phase of an OPA may be interpreted as a method of solving a polynomial equation. Assuming that the number of channels of the OPA is N, the number of unknowns of the polynomial equation is N. A phase of a channel may vary between 0 and $2\pi$. A phase of a channel may be divided into a plurality of steps between 0 and $2\pi$. Assuming that the number of steps is m (m is generally greater than 10), theoretically, a (beam) phase profile measuring process of $m^N$ times is required in order to evaluate all phase profiles with respect to an OPA. In addition to this, when evaluations of beams in all directions are performed for beam steering, a lot of time and cost may be consumed.

Accordingly, a correct and rapid numerical optimization method is required for a phase calibration, and thus, up to the present time, various methods have been attempted.

The optimization method may be largely divided into two methods. The first method is a random-based optimization method, and the second method is an analytical optimization method.

The random-based optimization method is a method of finding an optimum solution based on randomly generated seed and population. In the random, a well-known means, that is, a Genetic Algorithm (GA) or a Differential Evolution Algorithm (DEA), may be used.

The analytical optimization method is a method of analytically finding a local solution starting from a single specific phase profile. In the analytical optimization method, a well-known means, that is, a Gradient Descent Algorithm, a Hill Climber Algorithm, or a Rapid Search Algorithm, may be used.

The random-based optimization method has an advantage that a solution close to a global solution to be obtained may be found. However, in the case of the random-based optimization method, the algorithm and a calculation process are complicated and a converging speed is very slow, and thus, it is inefficient to apply the random-based optimization method to an actual situation.

The analytical optimization method has advantages that a calculation process is simple and a local solution may be found at a high speed. However, in the case of the analytical optimization method, generally, the quality of the solution is lower than that of the random-based optimization method.

The embodiment disclosed herewith provides a method of finding a high quality phase optimum solution at a high speed, that is, a method of finding an optimum phase profile by performing a single point beam forming of an OPA by combining the two methods, and a method of performing a phase optimization in each direction of OPA output light, that is, a method of performing a phase optimization at a high speed for beam steering by using a phase gradient method and the analytical optimization method.

Hereafter, a phase optimization method of an OPA according to an embodiment will now be described in detail with reference to the accompanying drawings. In the drawings, thicknesses of layers or regions are exaggerated for clarity of the specification.

FIG. 1 is a diagram briefly showing a beam steering device for realizing an OPA phase optimization according to an OPA optimization method according to an example embodiment.

Referring to FIG. 1, the beam steering device may include a light source 20, an OPA 22, a reflection member 24, a detector 26, a computer 28 (e.g., a microprocessor), and a control board 30. The light source 20 may emit a light to the OPA 22 so that the light passes through the OPA 22 and outputs toward the reflection member 24. The light source 20 may be a laser. The reflection member 24 may be a reflection plate or a mirror. The light reflected by the reflection member 24 may propagate to the detector 26, and the detector 26 may detect the light and generate an image based on the detected light.

According to an example embodiment, the light emitted from the OPA 22 may directly travel to the detector 26 without passing through the reflection member 24. A profile of a beam emitted from the OPA 22 may have a wide emission angle like a fan shape. Therefore, a distance from the OPA 22 to the reflection member 24 may be relatively small. The detector 26 may have a wide field of view (FOV). The detector 26 may be a high sensitive camera (visible light-silicon, near infrared ray-GaAs, etc.) or a photo detector array that is suitable to a wavelength of a light signal. A result of an image or a light pattern acquired by the detector 26 may be transmitted to the computer 28. The computer 28 determines the quality of the transmitted image and performs an optimization by using an algorithm. A new phase profile computed in the computer 28 is transmitted to the OPA 22 through the control board 30 which may be exclusively used for the OPA 22. The control board 30 may be designed to control a phase of the OPA 22 and control a phase through a voltage control. The phase of the OPA 22 may be controlled in a range from 0 to 2π through a voltage control.

Figure 2:
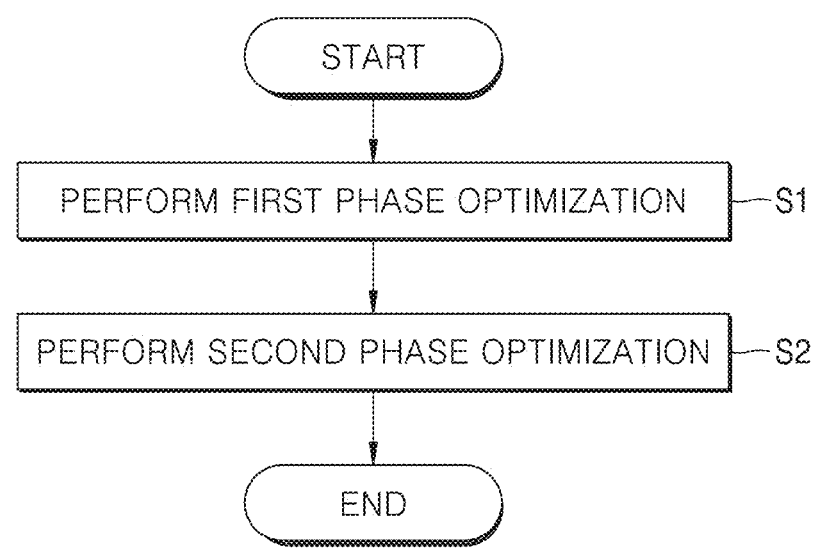
FIG. 2 is a flowchart of a method of an OPA phase optimization according to an example embodiment.

FIG. 2 is a flowchart of a method of an OPA phase optimization according to an example embodiment. The flowchart of FIG. 2 shows a phase optimization method of a beam forming process in an OPA phase optimization process.

Referring to FIG. 2, the first optimization method includes a first operation S1 and a second operation S2. The first operation S1 includes a process of performing a first phase optimization. The second operation S2 may be performed with respect to a phase profile obtained in the first operation S1. The phase profile shows a phase of each channel of the OPA, and the phase profile may correspond to a voltage profile in that the phase of each channel is determined or controlled by a voltage applied to each channel.

The process of performing the first phase optimization of the first operation S1 includes a phase optimization process that is performed by using a random-based optimization algorithm. According to the random-based optimization algorithm, random changes are applied to current solutions to general new solutions. For example, the first operation S1 may be performed by using a single genetic algorithm (GA) which will be described below. A process of performing the second phase optimization of the second operation S2 may be performed by using a local optimization method which is an analytical approach method. The local optimization method may include, for example, a step scan and/or a hill climb (HC) optimization. The second operation S2 may be performed by using at least one of the step scan and the HC. When both of the step scan and the HC are used, the step scan is performed ahead of the HC, and the HC may be performed with respect to a result of the step scan. A process of using the step scan and the HC for the second phase optimization will be described below.

When the first operation S1 is performed by using a GA, the first operation S1 may be performed for a set time or the number of set evaluation times. For example, in the first operation S1, the GA may be performed for a set time or as the number of evaluation times that are set through a simulation or a test. The time or the number of evaluation times for performing the GA may be approximately set through a simulation or a test. In the setting process, the required time and the quality of a final result which are obtained from a simulation or a test may be considered. The time or the number of evaluation times for performing the GA depends on the type of OPA or the number of channels, and thus, they are not fixed factors.

A local optimization may be performed in the second operation S2 based on a solution, that is, a phase profile obtained by using the GA in the first operation S1. In this way, an optimized phase profile (a voltage profile) for a beam forming with respect to a single point is obtained.

Figure 3:
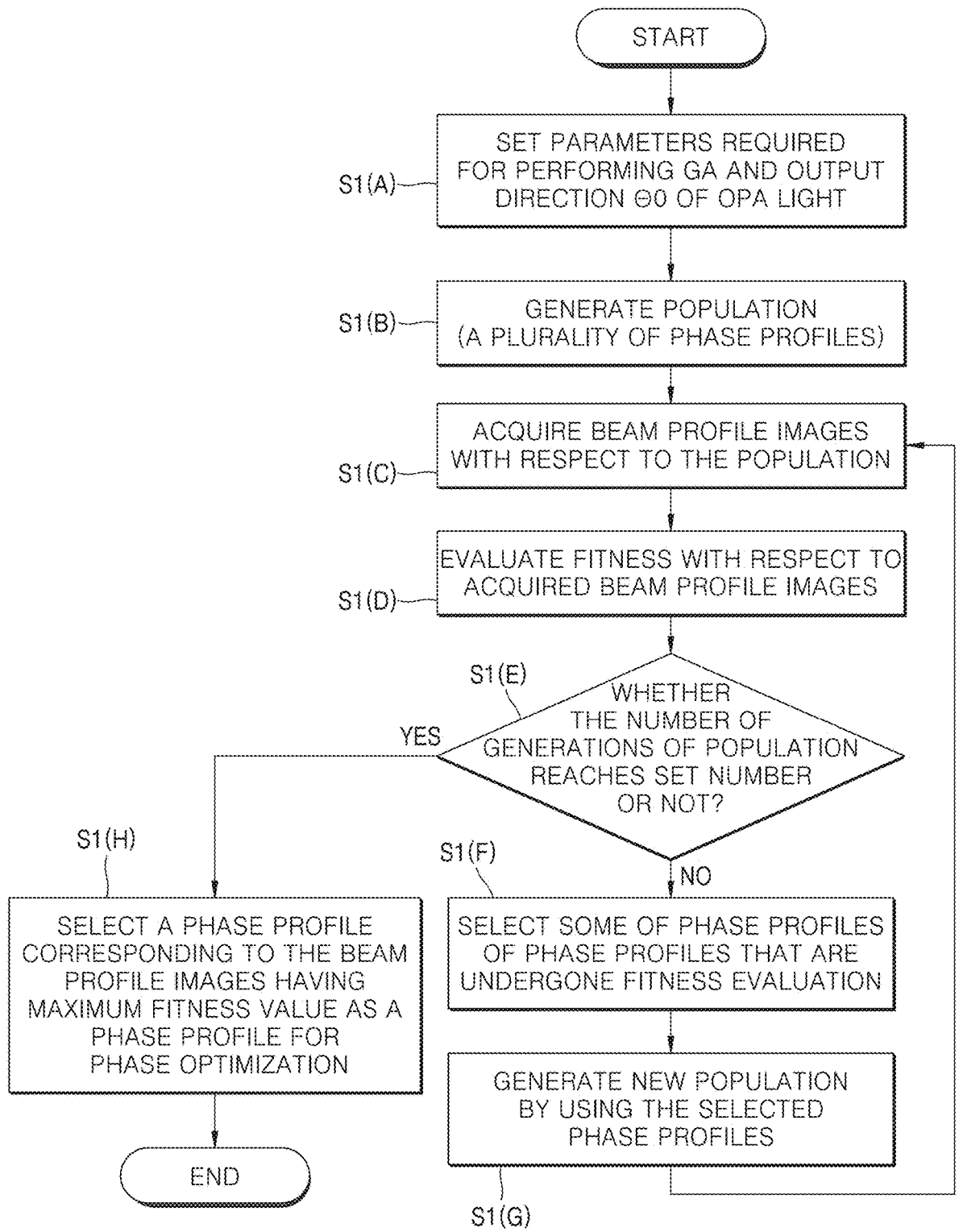
FIG. 3 is a flowchart of a process of performing a first phase optimization of FIG. 2 based on a genetic algorithm (GA)

FIG. 3 is a flowchart of a process of performing the first phase optimization of the first operation S1 of FIG. 2 by using a GA.

Referring to FIG. 3, in operation S1(A) of a process for performing the first phase optimization by using the GA, parameters required for performing the GA and an OPA light emission direction $\theta_0$ are set. The parameters may be, for example, a population number nP, nG (the number of times of population generation), a selection pressure, a crossover probability, a mutation probability, etc.

The set of the OPA light emission direction $\theta_0$ is setting of a first location for focusing a beam, and may be set at a predetermined angle θ. For convenience, the center (θ=0) of a direct front face of the OPA is set as an emission direction on the first time.

The population number nP may denote the number of phase profiles, and may denote the number of voltage profiles to be applied to the OPA. In detail, the population number nP may be the number of the voltage profiles to be applied to the OPA. When the voltage profile is applied to the OPA, a phase of each channel of the OPA is determined, and then, light is emitted from the OPA. A light image, that is, a beam profile, may be obtained by receiving the emitted light. The GA for the first phase optimization of the first operation S1 of FIG. 2 may be performed for a set time or until the nG is reached a set value.

In the related art, the GA is used until a final phase profile for a phase optimization is obtained, and thus, a lot of time is consumed until a final solution is obtained.

In the case of a selective voltage, the higher the selective voltage, the higher the possibility of selecting a phase profile having a large fitness value. The crossover probability is a possibility that channel exchanges occur between the selected phase profiles after a fitness evaluation. For example, phase profiles (voltage profiles) of some channels of selected phase profiles may be exchanged with phase profiles (voltage profiles) of some channels of other selected phase profiles. Accordingly, the phase profiles of the some channels of the selected other phase profiles may be applied to the some channels of the selected phase profiles. Also, the phase profiles of the some channels of the selected phase profiles are applied to some channels of selected other phase profiles. The higher the crossover probability, the higher the ratio of exchanging phase profiles between the selected phase profiles. The mutation probability is related to a ratio of channels, the phases of which are changed (an applying voltage is changed), of the channels included in each selected phase profile after evaluating a fitness. For example, when 100 channels are included in the first phase profile of the selected phase profiles, the mutation may denote changing phases (or applied voltage) of some channels, for example, channel No. 2 and channel No. 10 of 100 channels to arbitrary values. As the mutation probability increases, the number of channels in which the phases (or applied voltage) are changed is increased.

Operation S1(B) includes an operation of generating a population. The population is generated at an initial stage and includes a plurality of phase profiles that are arbitrary generated.

Operation S1(C) includes an operation of obtaining a beam profile image with respect to a population. The beam profile image may be obtained by detecting light emitted when the plurality of phase profiles (voltage profiles) of the population generated in operation S1(B) are applied to an OPA. The beam profile image may be obtained by as many as the number of phase profiles included in the population.

Operation S1(D) includes an operation of evaluating a fitness with respect to an acquired beam profile image. The fitness evaluation is to evaluate how much the acquired beam profile image matches a set reference image.

A fitness value with respect to the selected beam profile image is a ratio of light intensity at a location corresponding to the set first location of the selected beam profile image with respect to the entire light intensity of the selected beam profile image.

Fitness values with respect to the acquired beam profile images are determined by the fitness evaluations. A sequence of the acquired beam profiles is determined according to the fitness values from a higher fitness value to a lower fitness value.

In operation S1(E), it is determined whether the reaches a set number or not. When the nG reaches the set number (YES), operation S1(H) is performed. That is, a phase profile (a voltage profile) corresponding to a beam profile image having a maximum fitness value is selected as a phase profile for phase optimization.

When the nG has not reached the set number (NO), some of the phase profiles that have undergone a fitness evaluation are selected in operation S1(F). In particular, the selected phase profiles may be phase profiles corresponding to beam profile images having a high fitness value from a result of the fitness evaluation. However, according to the selection pressure, some of the beam profile images selected in operation S1(F) may be phase profiles corresponding to beam profile images having a middle or lower fitness value.

Next, in operation S1(G), a new population is generated by using the selected phase profiles. The number of phase profiles included in the new population may be equal to the number of phase profiles included in the population generated in operation S1(B).

The new population may be generated by performing a crossover process with respect to the phase profiles selected in operation S1(F). The crossover process may be performed until a desired number of phase profiles are formed. A mutation process may be performed instead of the crossover process. In some other embodiments, the mutation process may be added to the crossover process. The crossover process and the mutation process will be described below with reference to FIGS. 4 and 5.

After generating a new population in operation S1(G), the processes are repeated from operation S1(C).

Figure 4:
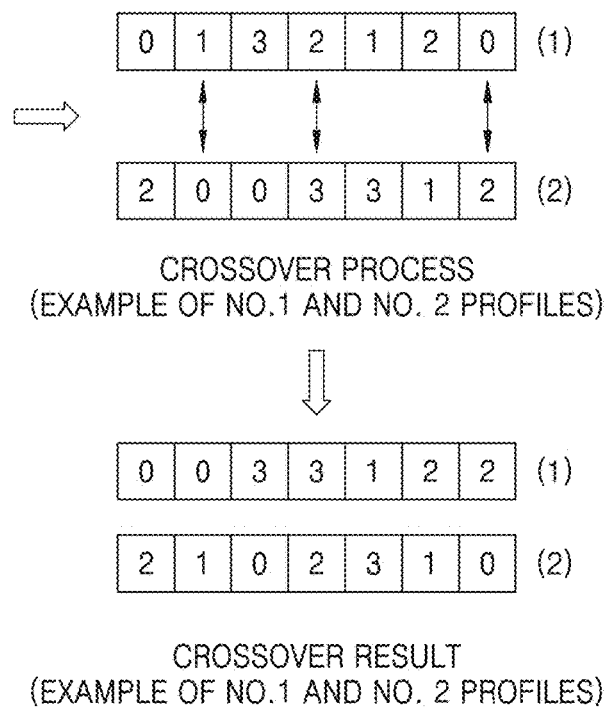
FIG. 4 shows a crossover process for generating a new population of step S1(G) of FIG. 3.

FIG. 4 shows a crossover process for generating a new population of operation S1(G) of FIG. 3.

In FIG. 4, a population including the first through fourth phase profiles (1) through (4) is selected after the fitness evaluation in operation S1(F) of FIG. 3. After the fitness evaluation, more than four phase profiles may be selected to generate a new population. For example, the first phase profile (1) includes genes (i.e., bitstrings) having phase values of 0, 1, 3, 2, 1, 2, and 0, the second phase profile (2) includes genes having phase values of 2, 0, 0, 3, 3, 1, and 2, the third phase profile (3) includes genes having phase values of 1, 1, 1, 2, 2, 3, and 0, and the fourth phase profile (4) includes genes having phase values of 3, 0, 1, 2, 3, 2, 1. It is set that each of the selected first through fourth phase profiles (1) through (4) includes 7 channels, but more than 7 channels may be included. The figure of channels indicates a voltage applied to each channel.

Of the first through fourth phase profiles (1) through (4), two phase profiles are arbitrarily selected for a crossover. As an example, the first and second phase profiles (1) and (2) are selected. The crossover occurs between the second, fourth, and seventh channels ch2, ch4, and ch7 of the first and second phase profiles (1) and (2). In detail, a phase of the second channel ch2 of the first phase profile (1), that is, a voltage 1 applied to the second channel ch2 of the first phase profile (1) is exchanged with a phase of the second channel ch2 of the second phase profile (2), that is, a voltage applied to the second channel ch2 of the second phase profile (2). From this result, as shown in a crossover result, the voltage applied to the second channel ch2 of the first phase profile (1) is changed from 1 to 0, and the voltage applied to the second channel ch2 of the second phase profile 2 is changed from 0 to 1. The same crossover occurs between the fourth and seventh channels ch4 and ch7 of the first and second phase profiles (1) and (2). As seen in the crossover result, according to the crossover, a phase state of each of the channels of the first and second phase profiles (1) and (2), that is, a voltage state applied to each of the channels is different from the voltage state before the crossover. As a result, two new phase profiles are generated through a once crossover. Assuming that the number of phase profiles included in the population of operation S1(B) of FIG. 3 is 100, a new population including 100 new phase profiles may be generated by performing the crossover process 50 times.

Figure 5:
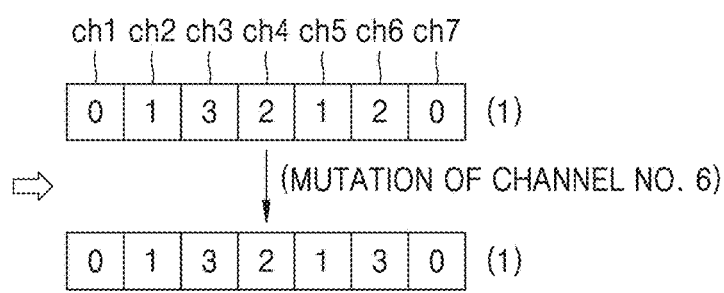
FIG. 5 shows a mutation process used in a process for generating a new population of step S1(G) of FIG. 3.

FIG. 5 shows a mutation process used in a process for generating a new population of operation S1(G) of FIG. 3.

For a mutation, an arbitrary phase profile may be selected from the first through fourth phase profiles (1) through (4) that are selected after a fitness evaluation. For explanation of the mutation, the first phase profile (1) is selected. The mutation is changing a phase (applied voltage) of a channel of the first through seventh channels ch1 through ch7 in the first phase profile (1) to another value. For example, in the mutation, a phase (applied voltage) of the sixth channel ch6 of the first through seventh channel ch1 through ch7 may be changed into another value. As a result of the mutation, a voltage value of the sixth channel ch6 of the first phase profile (1) is changed from 2 to 3, and accordingly, the first phase profile (1) is a new phase profile. The mutation process may be performed with respect to a phase profile that has undergone the crossover process of FIG. 4.

Figure 6:
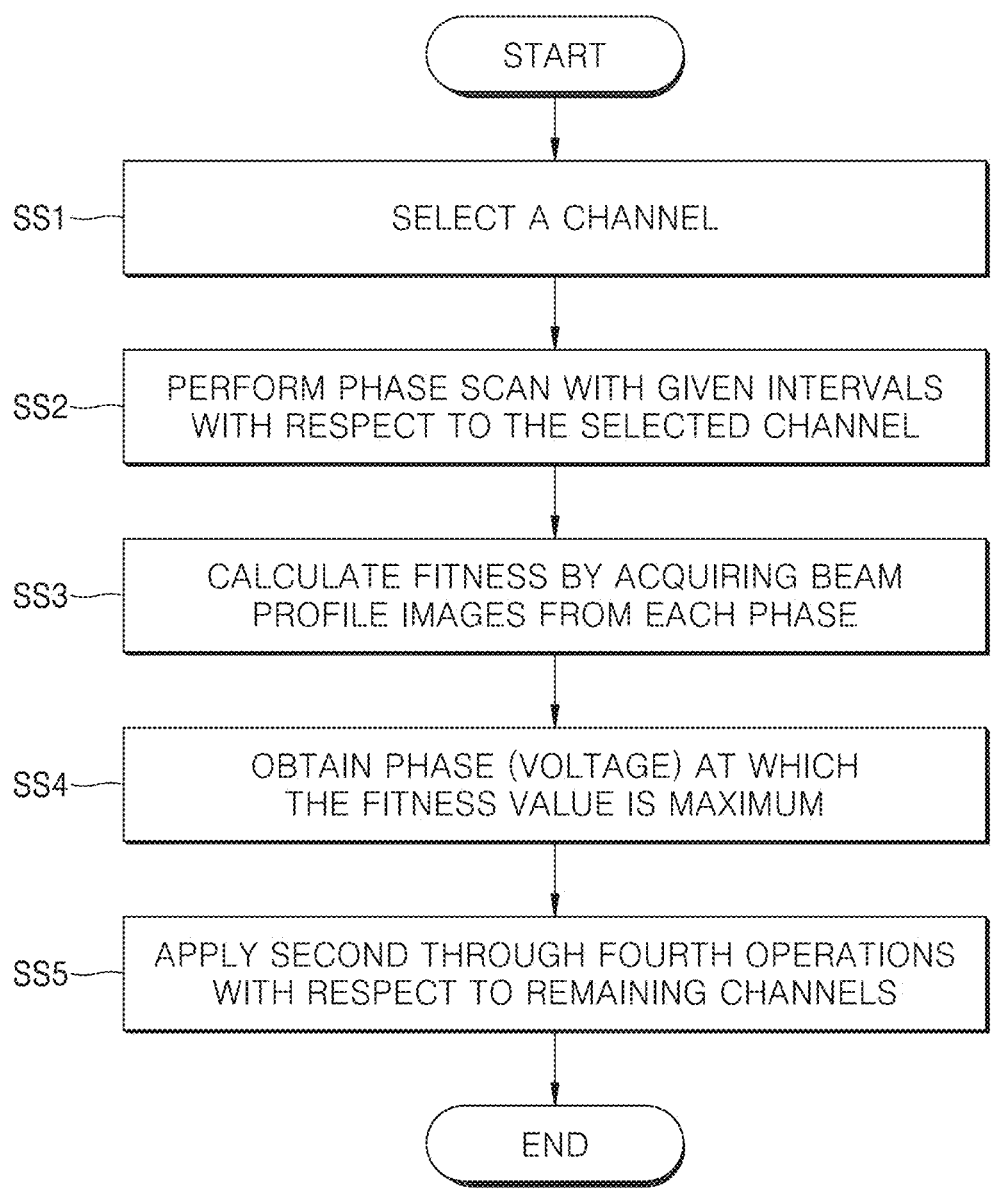
FIG. 6 is a flowchart showing a process of performing a step scan for a second phase optimization of FIG. 2.

FIG. 6 is a flowchart showing a process of performing a step scan for a second phase optimization of the second operation S2 of FIG. 2.

The step scan of FIG. 6 may be performed with respect to the phase profile obtained through the first phase optimization operation of FIG. 3.

Referring to FIG. 6, in operation SS1, a channel for performing a scan is selected. As an example, a first channel of a phase profile obtained through the first phase optimization operation is selected. A phase scan is performed with respect to the first channel in operation SS2. That is, the phase scan is performed with respect to the first channel from 0 to $2\pi$, but the phase scan may be performed step by step with a given interval. For example, when the phase of the first channel is 0, $\pi/4$, $\pi/2$, $3\pi/4$, $\pi$, $5\pi/4$, $6\pi/4$, $7\pi/4$, and $2\pi$, a beam profile image in each phase is obtained and then a fitness is calculated in operation SS3. A phase of the first channel is expressed by applying a voltage corresponding to the phase to the first channel. Accordingly, the change of the phase of the first channel from 0 to $2\pi$ may denote the change of a voltage from a voltage V0 corresponding to a phase 0 to a voltage Vmax corresponding to a phase $2\pi$. From a result of phase scan and fitness calculation with respect to the first channel, a phase (voltage) in which the fitness value is maximum with respect to the first channel may be obtained in operation SS4. The phase scan and fitness calculation process with respect to the first channel may be applied to remaining channels of the phase profile obtained through the first phase optimization operation, in operation SS5. As a result, a phase (voltage) in which the fitness value is maximum may be obtained in each of the channels. That is, a new phase profile (a voltage profile) may be obtained.

The step scan process of FIG. 6 is performed with respect to all N channels included in a phase profile. However, the smaller the phase scan interval in the phase scan process, that is, the smaller the interval of voltage applied to the channels, the quality of phase optimization increases, but it may take a long time. When this method is repeatedly performed twice or more, the quality of phase optimization may further be increased. In most cases, when this method is used, a better quality of a phase profile may be obtained as compared to a phase profile obtained by a GA. Afterwards, in order to further increase the quality of the phase profile, as depicted in FIG. 7, an HC may be performed.

Figure 7:
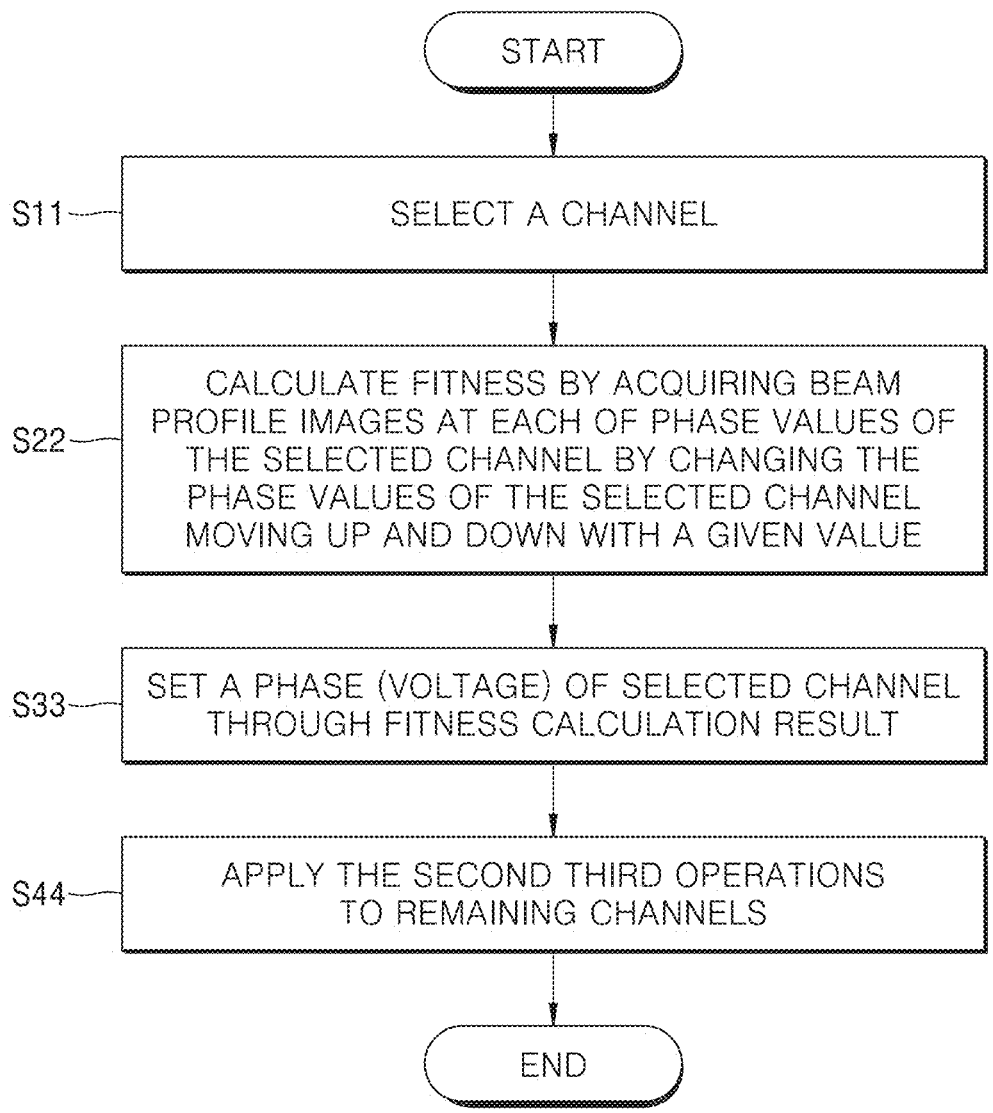
FIG. 7 is a flowchart showing a process of performing a hill climb (HC) optimization for the second phase optimization of FIG. 2.

FIG. 7 is a flowchart showing a process of performing an HC for the second phase optimization of the second operation S2 of FIG. 2.

Referring to FIG. 7, first, a channel is selected in operation S11. The channel selected in operation S11 may be the first channel of the phase profile (voltage profile) obtained through the step scan of FIG. 6. A fitness is calculated by acquiring a beam profile image at each phase value by changing the phase value (a voltage applying to the channel) of the selected channel up and down with a given value in operation S22. In this process, the phase value (a voltage applying to the channel) may be a phase value (a voltage) at which the fitness of the first channel of the phase profile (voltage profile) obtained through the step scan of FIG. 6 is maximum. Of results obtained through the fitness calculations of operation S22, a phase having the maximum fitness is determined as a phase of the first channel, and a voltage corresponding to the phase is set as a voltage of the first channel in operation S33. With respect to remaining channels, operations S22 and S33 performed with respect to the first channel may be applied. In this manner, phases (voltages) may be set with respect to all channels of the phase profiles (voltage profiles) obtained through the step scan of FIG. 6. In this way, the second phase optimization operation S2 of FIG. 2 is completed, and the phase optimization with respect to OPA beam forming is completed. That is, the phase profile (the voltage profile) obtained through the HC of FIG. 7 may be a phase profile that may optimize OPA beam forming.

In the case of the step scan of FIG. 6, each channel is scanned on the entire phase range (0~$2\pi$), but, in the case of the HC of FIG. 7, an initial value is compared with ambient values of the initial value V0, and thus, a result may be rapidly obtained. The initial value V0 may denote a phase value (a voltage) of a maximum fitness of each channel present in the phase profile (the voltage profile) obtained through the step scan of FIG. 6. However, when the HC is performed without the step scan in the second phase optimization operation S2 right after the GA of the first phase optimization operation S1 is performed, the initial value V0 may be a phase value of each channel present in a final phase profile obtained in the GA.

For efficiency, the interval of the phase scan performed in each channel in the HC of FIG. 7 is approximately a half of the interval of phase scan performed in each channel in the step scan of FIG. 6. For example, the phase scan interval of each channel in the step scan of FIG. 6 is 30° ($\pi/6$), and the phase scan interval of each channel in the HC of FIG. 7 may be approximately 15°.

A phase optimization with respect to the first location of OPA output light is completed through the three steps of the GA, the step scan, and the HC described above, or through two steps except the. In order to realize a beam steering by using an OPA, the phase optimization is required at many points, for example, more than 100 points. However, this process requires a significant time since the GA is included, and thus, a method of optimization by repeating this method in each point is very inefficient. Accordingly, a phase optimization considering up to a beam steering may be achieved at each point by performing a simple local optimization, such as a step scan and/or HC after controlling a direction of a beam by applying a phase gradient based on an optimized phase profile obtained with respect to a given direction. Here, the phase gradient denotes a linear phase gradient.

Figure 8A:
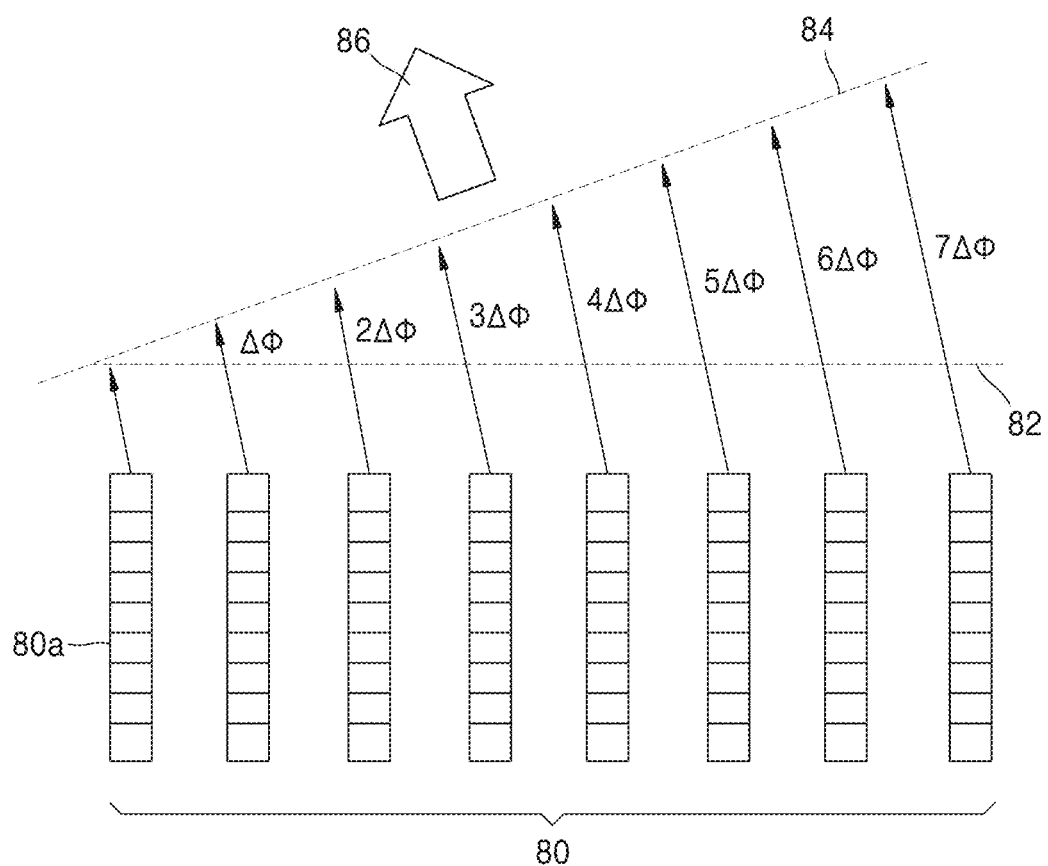
FIG. 8A is a plan view showing a case that a travelling direction of light emitted from a channel array of an OPA is changed when a phase gradient is applied to a phase profile in which a beam forming is completed.

FIG. 8A is a plan view showing a case that a travelling direction of light emitted from a channel array 80 of an OPA is changed when a phase gradient is applied to a phase profile in which beam forming is completed.

Referring to FIG. 8A, it is seen that a phase difference between channels 80*a* of the channel array 80 is constant as $\Delta\phi$. In FIG. 8A, reference 82 indicates a first wave front of light emitted from the channel array 80 before a phase gradient is applied, and reference 84 indicates a second wave front of light emitted from the channel array 80 after a phase gradient is applied. The second wave front 84 is inclined with respect to the first wave front 82 with a given angle, and the inclination angle is proportional to the phase gradient. As the phase gradient increases, the inclination angle increases.

Figure 8B:
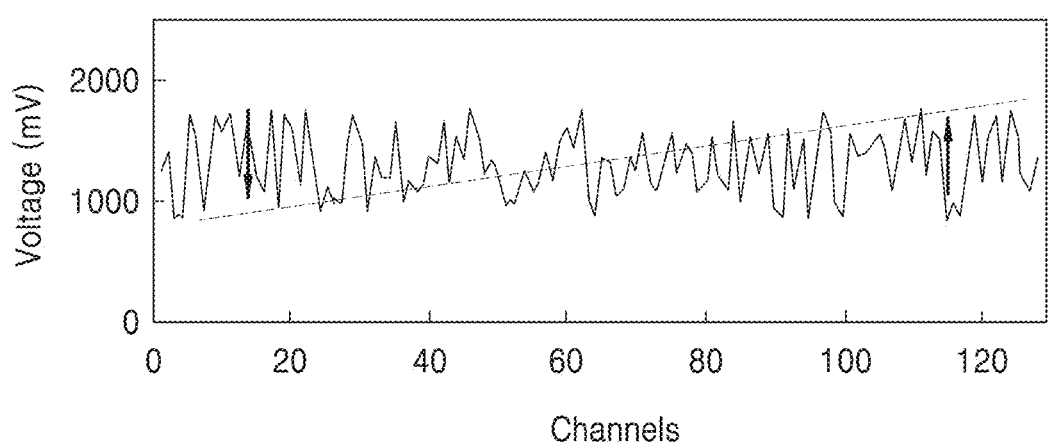
FIG. 8B is a graph showing a case that a linear phase gradient is applied to a phase profile (a voltage profile) in which a beam forming is completed.

FIG. 8B is a graph showing a case that a linear phase gradient is applied to a phase profile, that is, a voltage profile in which beam forming is completed. In FIG. 8B, the horizontal axis indicates channels and the vertical axis indicates voltages. The "phase gradient is applied" denotes a voltage having a gradient corresponding to the phase gradient is applied to the channel array 80. As depicted in FIG. 8B, when the phase gradient is applied to a phase profile in which beam forming is completed, the magnitude of voltage additionally added to each channel from the first channel to the last channel is linearly increased (dashed line).

Figure 8C:
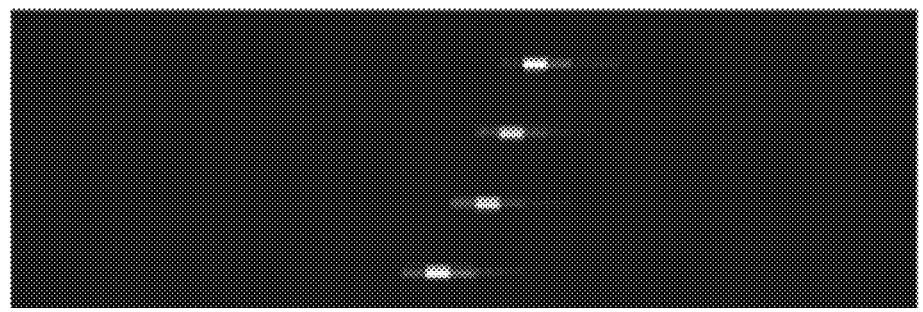
FIG. 8C is a photograph showing the movement of a beam forming location, that is, the movement of a focal point of a beam when a phase gradient is applied to a phase profile in which a beam forming is completed.

FIG. 8C is a photograph showing the movement of a beam forming location, that is, the movement of a focal point of a beam when a phase gradient is applied to a phase profile in which beam forming is completed. FIG. 8C shows that focal points of beams that are horizontally moved by the phase gradient control vertically overlap.

In an ideal situation, a beam focused should be steered while maintaining quality by the application of only a phase gradient, but, in an actual case, an additional optimization process together with the application of a phase gradient is required due to non-uniformity of thickness and interval of the channel array, non-linear relation of voltage and phase, non-uniform phase range in each channel, etc.

FIG. 9 is a flowchart showing operations of a phase optimization method (hereinafter, a second optimization method) for OPA beam steering with respect to multipoint in an OPA phase optimization method according to an example embodiment.

Referring to FIG. 9, first, another location different from a beam forming location is selected in operation SP1. The another location of operation SP1 is a location close to the beam forming location and may be a location having a horizontally given angle with respect to the beam forming location. The beam forming location may be a location at which beam forming is completed and an optimum phase profile is obtained through FIGS. 3 through 7.

Next, a phase gradient value at which a fitness is maximum at the another location by scanning the phase gradient in a given range in operation SP2. The phase gradient may give a change to a travelling direction of light emitted from an OPA. The phase "applying a phase gradient to a phase profile" denotes that the size of phase added to the channels is linearly increased or decreased from the first channel to the last channel in adding a phase to each channel of the corresponding phase profile. Accordingly, in the case of a phase profile having a phase gradient, a phase difference between the channels is constant. Accordingly, a change may be given to a phase gradient of the corresponding phase profile by controlling the phase difference between the channels of the phase profile.

A fitness is calculated by acquiring a beam profile image of each phase gradient by scanning phase gradient change in a given range with a phase gradient corresponding to the another location as the center. Through the calculation, a phase gradient at which the fitness is maximum on the other location may be found. The phase gradient found in this way is applied to a phase profile that is optimized with respect to beam forming in operation SP3.

Next, a local optimization is performed with respect to a phase profile to which the phase gradient is applied in operation SP4. The local optimization at this point may be performed by using only the step scan described above or the step scan together with the HC. In this way, the phase optimization for beam steering to the another location is completed. That is, an optimized phase profile required for performing beam steering to the another location is obtained.

A phase optimization for beam steering with respect to other locations may be performed by repeating operations SP2, SP3, and SP4 in operation SP5.

When these processes are consecutively performed in all angle regions of OPA output light, optimized phase profiles in all angles may be obtained. As a result, an optimum beam steering in real time may be realized.

The beam steering phase optimization method according to the present embodiment may provide a much higher quality and may realize the phase optimization at a higher speed as compared to the related art in which only a local optimization at each point is performed. As a result, a beam steering in real time may be possible at a high speed while maintaining the quality of beam forming.

Also, through the above processes, optimized phase profiles for beam steering in all angles in a viewing angle of an OPA may be obtained, and thus, a look-up table (LUT) may be obtained.

Next, an example experiment of beam forming with respect to multipoint to which the OPA phase optimization method according to an embodiment is applied will be described.

In the experiment, a silicon OPA including 128 channels that is developed for a LiDAR system is used. In the silicon OPA used in the experiment, an antenna layer pattern, that is, a channel array pattern, is arranged in random intervals to repress a $2^{nd}$ mode that occurs in a cycle structure. In the experiment, light that is a short wavelength IR of a 1310 nm band is used, and an InGaAs camera is used as a detector.

Figure 10:
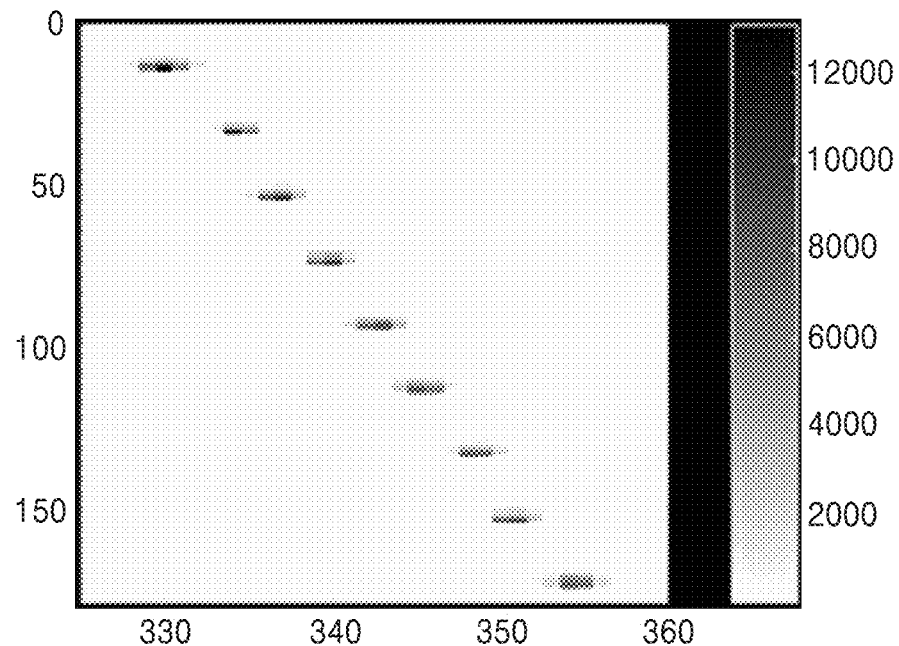
FIGS. 10, 11, and 12 are photographs and graphs showing beam forming test results with respect to multipoint to which an OPA phase optimization according to an example embodiment is applied.
Figure 11:
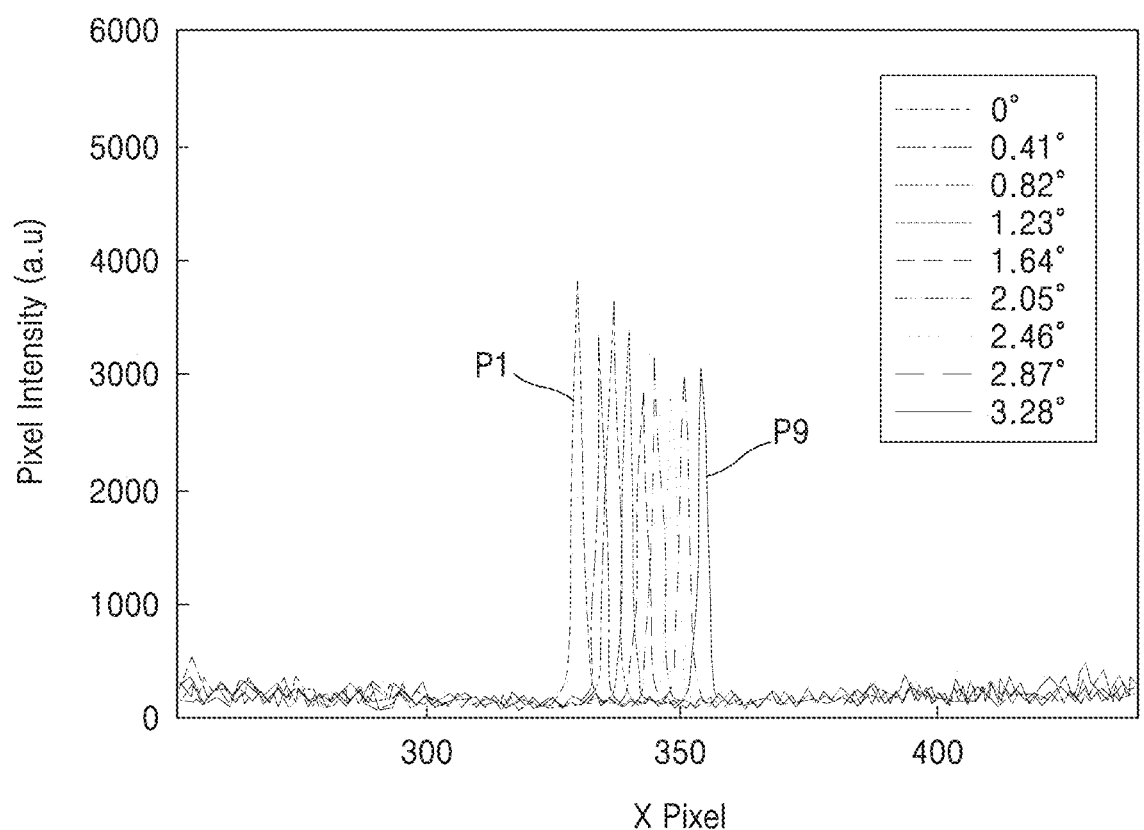
Figure 12:
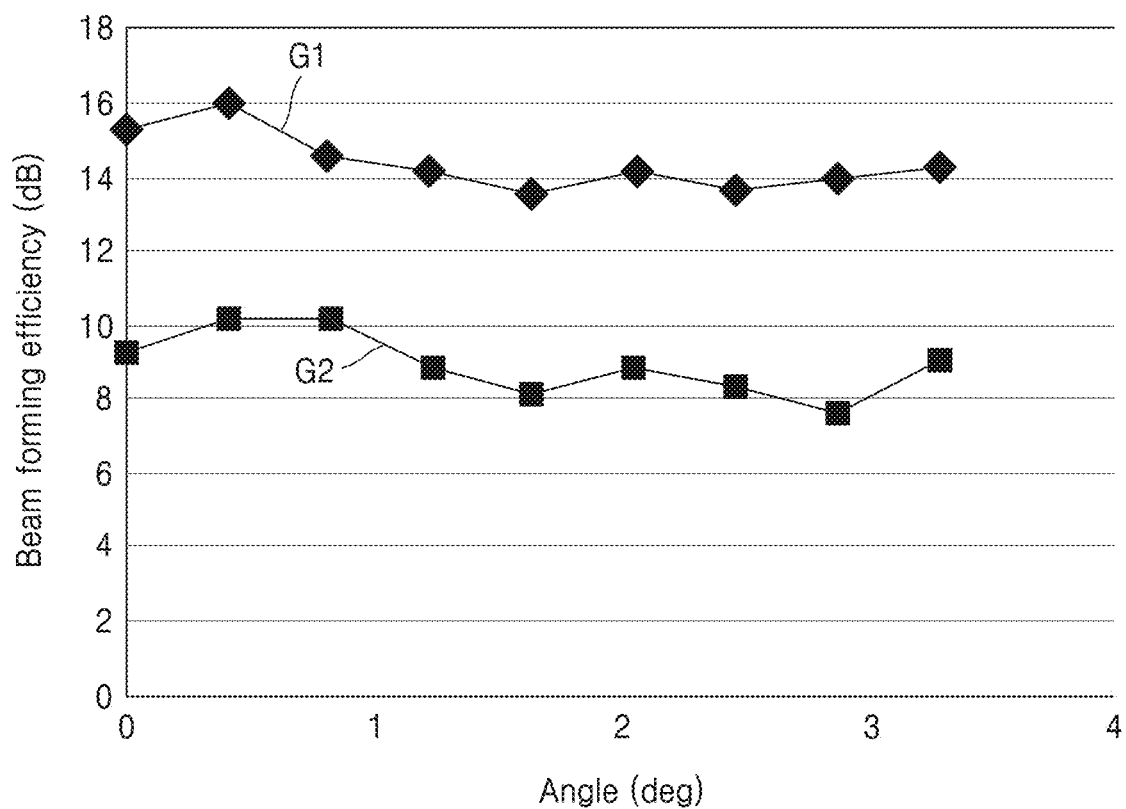

FIGS. 10, 11, and 12 show experiment results.

FIG. 10 is an image showing images of beam forming results with respect to each of 9 locations continuously located in a horizontal direction, the images are overlapped in a Y direction. FIG. 11 is graphs showing pixel intensities in a horizontal direction with respect to the 9 locations, the beam forming of which are completed, depicted in FIG. 10. Referring to the graphs, it is seen that large peaks (pixel intensities) appear in only the beam forming locations, the beam forming of which are completed, and significant peaks do not appear in the remaining regions. As the result shown in FIG. 12, this may denote that there is almost no noise in the beam forming result. A first peak P1 located leftmost in FIG. 11 is a peak appearing as a result of beam forming with respect to a location at an angle of 0 degree which is a reference point and corresponds to a pixel intensity of the leftmost upper side of FIG. 10. Also, the rightmost peak is the $9^{th}$ peak P9 that indicates a beam forming result with respect to an inclined location by approximately 3.28° with respect to the reference point and corresponds to a pixel intensity of the rightmost lower side of FIG. 10.

FIG. 12 shows a signal to noise ratio (SNR) (a ratio of average noise to peak value) at the each of the 9 locations and a side mode suppression ratio (SMSR) (an intensity ratio of second peak to first peak). The horizontal axis indicates angles, and the vertical axis indicates beam forming efficiency. A first graph G1 indicates SNR and a second graph G2 indicates SMSR.

Referring to the first and second graphs G1 and G2 of FIG. 12, it is seen that as an angle increases, that is, the location is gradually away from the reference point, the SNR and the SMSR are in a reducing trend compared to the reference point, but the reducing rate is not so significant. This result denotes that the beam forming efficiency is steady in the case when a beam steering is accompanied.

In the above experiment, the phase optimization with respect to the reference point is performed according to the first phase optimization method (refer to FIG. 2) described above, and the phase optimizations with respect to the remaining 8 locations are performed according to the second phase optimization method (refer to FIG. 9).

In the phase optimization method of an OPA according to an embodiment, a complex method is employed for a phase optimization in a beam forming process. That is, a phase optimization is performed by using an approaching method based on a random method together with a local optimization method. Thus, an optimization time may be reduced compared to the optimization method of the related art, and not only a beam forming efficiency with respect to a single point, but also a beam forming efficiency with respect to multipoint that accompanies a beam steering are highly maintained.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing example embodiments are merely example and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A phase optimization method of an optical phased array (OPA), the phase optimization method comprising:
    performing a phase optimization in a beam forming process with respect to a single focal point,
    wherein the performing the phase optimization in the beam forming process comprises:
        performing a first phase optimization in a genetic algorithm method to obtain a first beam phase profile; and
        after performing the first phase optimization, sequentially applying to the first beam phase profile, a step scan method in which a phase scan is performed step by step with a predetermined interval, and then a hill climb optimization method, to perform a second phase optimization.

2. The phase optimization method of claim 1, further comprising performing a multipoint phase optimization for a beam steering after performing the second phase optimization.

3. The phase optimization method of claim 2, wherein the performing the multipoint phase optimization for the beam steering comprises:
    setting a location different from a beamforming location of the single focal point; and
    applying a phase gradient to an updated beam phase profile obtained through the second phase optimization.

4. The phase optimization method of claim 3, further comprising controlling a phase of the updated beam phase profile by applying a local optimization method to the updated beam phase profile.

5. The phase optimization method of claim 4, wherein the controlling the phase the updated beam phase profile comprises:
    controlling, by the step scan method, the phase of the updated beam; and
    controlling, by the hill climb optimization method, the phase of the updated beam phase profile that is controlled by the step scan method.

6. A phase optimization method of an optical phased array (OPA), the phase optimization method comprising:
    performing a phase optimization in a beam forming process with respect to a single focal point,
    wherein the performing the phase optimization in the beam forming process comprises:
        generating a first beam phase profile by performing a first phase optimization in a genetic algorithm method; and
        performing a second phase optimization on the first beam phase profile in a second method that is different form the genetic algorithm method, and
    wherein the generating the first beam phase profile comprises:
        generating a population comprising a plurality of beam phase profiles in a first operation;
        acquiring beam profile images with respect to the plurality of beam phase profiles in a second operation;
        evaluating a fitness with respect to the acquired beam profile images in a third operation;
        selecting at least one phase profile of the plurality of beam phase profiles on which the evaluating of the fitness is performed, in a fourth operation;
        generating a new population based on the selected at least one phase profile of the plurality of beam phase profiles, in a fifth operation; and
        repeating the second operation through the fifth operation with respect to the new population, and when a number of generations of the new population reaches a set number, selecting a beam phase profile corresponding to a maximum fitness value as the first beam phase profile.

7. The phase optimization method of claim 6, wherein the fifth operation comprises performing a crossover with respect to two beam phase profiles of the plurality of beam phase profiles.

8. The phase optimization method of claim 6, wherein the fifth operation comprises performing a mutation on the selected at least one beam phase profile of the plurality of beam phase profiles.

9. A phase optimization method of an optical phased array (OPA), the phase optimization method comprising:
    performing a single phase optimization in a beam forming process with respect to a single focal point; and
    performing a multipoint phase optimization after performing the single phase optimization, wherein the performing the single phase optimization comprises:
   performing a first phase optimization in a first method to obtain a first beam phase profile; and
   performing a second phase optimization on the first beam phase profile in a second method that is different form the first method; and
wherein the performing the multipoint phase optimization comprises:
   setting a location different from a beamforming location of the single focal point; and
   applying a phase gradient to an updated beam phase profile obtained through the second phase optimization, and
wherein the applying the phase gradient to the updated beam phase profile comprises:
   finding a phase gradient value at which a fitness is maximum in the location different from the beamforming location of the single focal point by performing a phase gradient scan in a given range with the phase gradient; and
   applying the phase gradient value to the updated phase profile obtained through the second phase optimization.

10. A beam steering device comprising at least one processor configured to:
   perform a single phase optimization in a beam forming process with respect to a single focal point by performing a first phase optimization in a genetic algorithm method to obtain a first beam phase profile and then, sequentially applying to the first beam phase profile, a step scan method in which a phase scan is performed step by step with a predetermined interval, and then a hill climb optimization method; and
   perform a multipoint phase optimization by setting a location different from a beamforming location of the single focal point as a multipoint focal point, and applying a phase gradient to an updated beam phase profile obtained through the single phase optimization.

* * * * *